United States Patent
Kodama et al.

(10) Patent No.: US 10,019,189 B2
(45) Date of Patent: Jul. 10, 2018

(54) STORAGE MANAGEMENT APPARATUS, STORAGE APPARATUS MANAGEMENT METHOD, AND COMPUTER-READABLE RECORDING MEDIUM

(71) Applicant: FUJITSU LIMITED, Kawasaki-shi, Kanagawa (JP)

(72) Inventors: Kiyoyuki Kodama, Numazu (JP); Kiyoshi Sugioka, Mishima (JP); Tadashi Murase, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/466,353

(22) Filed: Mar. 22, 2017

(65) Prior Publication Data

US 2017/0308317 A1    Oct. 26, 2017

(30) Foreign Application Priority Data

Apr. 22, 2016    (JP) ................................ 2016-086573

(51) Int. Cl.
     *G06F 12/00*      (2006.01)
     *G06F 3/06*      (2006.01)

(52) U.S. Cl.
     CPC ............ *G06F 3/0634* (2013.01); *G06F 3/067* (2013.01); *G06F 3/0613* (2013.01)

(58) Field of Classification Search
     CPC ..... G06F 3/0634; G06F 3/0653; G06F 3/0604
     See application file for complete search history.

(56) References Cited

U.S. PATENT DOCUMENTS

| | | |
|---|---|---|
| 2005/0193167 A1 | 9/2005 | Eguchi et al. |
| 2005/0193168 A1 | 9/2005 | Eguchi et al. |
| 2007/0055820 A1 | 3/2007 | Eguchi et al. |
| 2010/0325379 A1 | 12/2010 | Eguchi et al. |
| 2012/0042138 A1 | 2/2012 | Eguchi et al. |
| 2013/0232261 A1* | 9/2013 | Wright ............... H04L 41/50 709/224 |
| 2015/0281357 A1 | 10/2015 | Makida et al. |

FOREIGN PATENT DOCUMENTS

| | | |
|---|---|---|
| JP | 06-203111 | 7/1994 |
| JP | 2005-242690 | 9/2005 |
| JP | 2015-191324 | 11/2015 |

\* cited by examiner

*Primary Examiner* — Kevin Verbrugge
*Assistant Examiner* — Arvind Talukdar
(74) *Attorney, Agent, or Firm* — Fujitsu Patent Center

(57) ABSTRACT

A preliminary investigation execution unit sequentially sets a plurality of target values for each of predetermined times and then executes adjustment of a bandwidth of a storage apparatus on the basis of each of the set target values. A performance information acquisition unit obtains performance information for each of predetermined times regarding a business server in a case where adjustment of a bandwidth by the preliminary investigation execution unit is not performed, and obtains the performance information regarding the business server for the predetermined time for each of the target values in a case where adjustment of the bandwidth is performed by the preliminary investigation execution unit. A notification unit notifies the performance information obtained. A bandwidth management unit adjusts a bandwidth of the storage apparatus on the basis of a specific target value, on the basis of an input of the specific target value after notification.

6 Claims, 10 Drawing Sheets

FIG.3

| TIME ZONE | 0:00 | 0:10 | 0:20 | 0:30 | 0:40 | ... | 18:00 | 18:10 | ... |
|---|---|---|---|---|---|---|---|---|---|
| PERFORMANCE SETTING VALUE | 0 | 1 | 2 | 3 | 4 | ... | 0 | 1 | ... |
| BEFORE IMPLEMENTATION [ms] | 5 | 5 | 6 | 7 | 7 | ... | 20 | 20 | ... |
| AFTER IMPLEMENTATION [ms] | 5 | 5 | 7 | 15 | 20 | ... | 21 | 21 | ... |
| COMPARISON [%] | 100 | 100 | 110 | 214 | 285 | ... | 105 | 105 | ... |
| CPU USAGE RATE [%] | 40 | 50 | 70 | 85 | 90 | ... | 50 | 40 | ... |
| MEMORY USAGE RATE [%] | 50 | 50 | 60 | 50 | 50 | ... | 50 | 50 | ... |

FIG.4

| PERFORMANCE SETTING VALUE | IOPS | THROUGHPUT [MB/s] | PERFORMANCE SETTING VALUE | IOPS | THROUGHPUT [MB/s] |
|---|---|---|---|---|---|
| 0 | UNLIMITED | UNLIMITED | 8 | 780 | 100 |
| 1 | 15,000 | 800 | 9 | 600 | 70 |
| 2 | 12,600 | 700 | 10 | 420 | 40 |
| 3 | 10,020 | 600 | 11 | 300 | 25 |
| 4 | 7,500 | 500 | 12 | 240 | 20 |
| 5 | 5,040 | 400 | 13 | 180 | 15 |
| 6 | 3,000 | 300 | 14 | 120 | 10 |
| 7 | 1,020 | 200 | 15 | 60 | 5 |

121

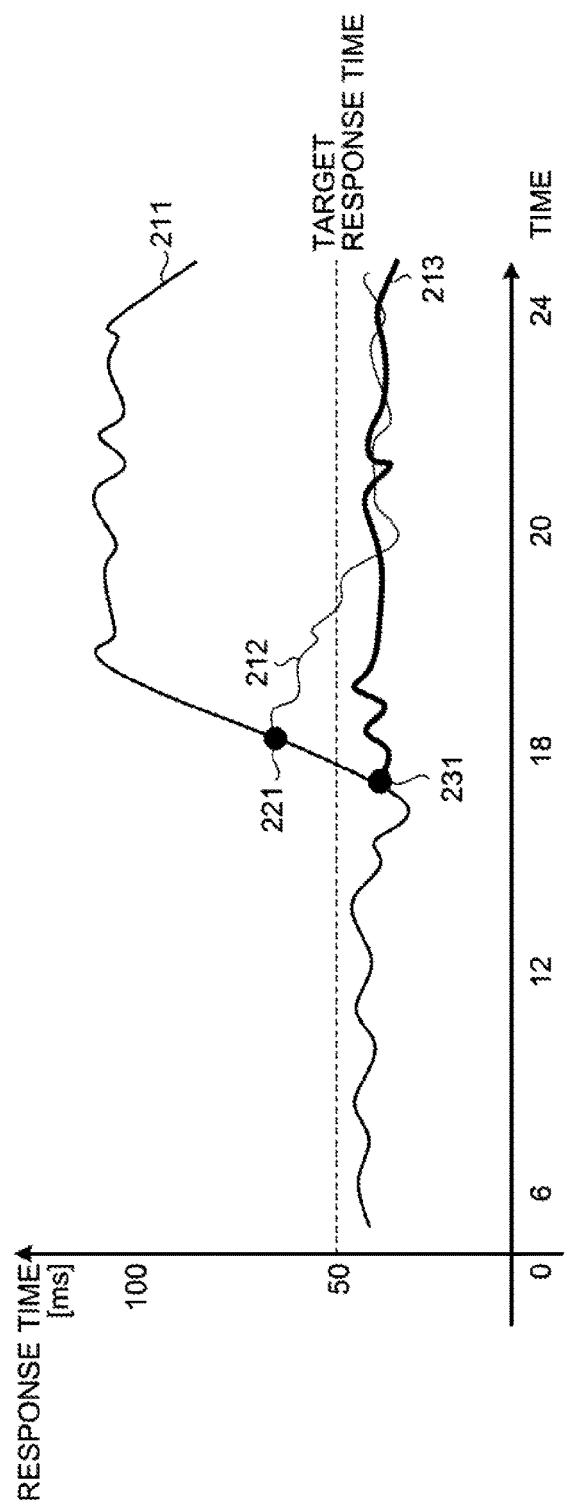

STORAGE MANAGEMENT APPARATUS, STORAGE APPARATUS MANAGEMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2016-086573, filed on Apr. 22, 2016, the entire contents of which are incorporated herein by reference.

FIELD

The embodiments discussed herein are related to a storage management apparatus, a storage apparatus management method, and a storage apparatus management program.

BACKGROUND

In recent years, open systems and server virtualization are becoming popular and system management is becoming more and more complicated. Accordingly, a storage system is commonly introduced on a view point of facilitation of system management and flexible adaptation to rapidly increasing data capacity, or the like.

In a storage system, for example, adjustment of a band limiting width of a data transfer path between a volume and a server that executes an application is performed, thereby adjusting performance of the storage system. In known arts, for example, an administrator sets a target value of input/output (I/O) performance toward a storage volume and automatically adjusts a bandwidth of a transmission path such that the storage achieves the target value, thereby adjusting the band limiting width.

As a method of adjusting storage system performance, there is a known art, for example, that adjusts the bandwidth so as to achieve a target value corresponding to a performance level set by the administrator. Another known art monitors a processing status by relaying an I/O request from a host to a storage subsystem, and changes the configuration when a high load storage subsystem is detected. Still another known art performs guidance of parameter setting by displaying information such as a processing result corresponding to an input parameter.

Patent Document 1: Japanese Laid-open Patent Publication No. 2015-191324

Patent Document 2: Japanese Laid-open Patent Publication No. 2005-242690

Patent Document 3: Japanese Laid-open Patent Publication No. 6-203111

In many cases, however, a storage load status changes for each of time zones, and thus, it would be difficult to follow by changing the target value in accordance with the change in the storage load status. Accordingly, it would be difficult to properly adjust the bandwidth.

Moreover, while initial target value setting would be facilitated by using the known art of providing target value setting in accordance with the performance level, it would still be difficult to set the target value in accordance with the changing status of the storage load. Moreover, it would also be difficult to continuously monitor the load and to set an appropriate target value with respect to the bandwidth in accordance with a result of monitoring, even with the known art of changing configurations in accordance with the load of the storage subsystem. Furthermore, while initial target value setting would be facilitated by using the known art of performing parameter setting guidance, it would still be difficult to set a target value in accordance with the change status of storage load. In short, even with any of the known arts, it would still be difficult to appropriately execute adjustment of bandwidth in accordance with the operation status of the storage apparatus.

SUMMARY

According to an aspect of an embodiment, a storage management apparatus that manages a storage apparatus on which data transmission and reception is performed with an information processing apparatus, the storage management apparatus including: a processor configured to: sequentially set a plurality of target values for each of a plurality of predetermined times and execute adjustment of a bandwidth of the storage apparatus on the basis of each of the set target values; obtain performance information for each of the predetermined times regarding the information processing apparatus in a case where adjustment of the bandwidth is not performed, and obtain the performance information regarding the information processing apparatus for the predetermined time for each of the target values in a case where the adjustment of the bandwidth is performed; notify the performance information obtained; and adjusts a bandwidth of the storage apparatus on the basis of a specific target value, on the basis of an input of the specific target value after notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary performance information table;

FIG. 4 is a diagram illustrating an exemplary performance setting value table;

FIG. 11 is a diagram for illustrating an effect of bandwidth adjustment using QoS evaluation processing performed by an operation management server according to the third exemplary embodiment.

DESCRIPTION OF EMBODIMENTS

Preferred embodiments of the present invention will be explained with reference to accompanying drawings. Note that the storage management apparatus, the storage apparatus management method, and the storage apparatus management program, disclosed by the present application, are not limited by the following exemplary embodiments.

[a] First Embodiment

Figure 1:
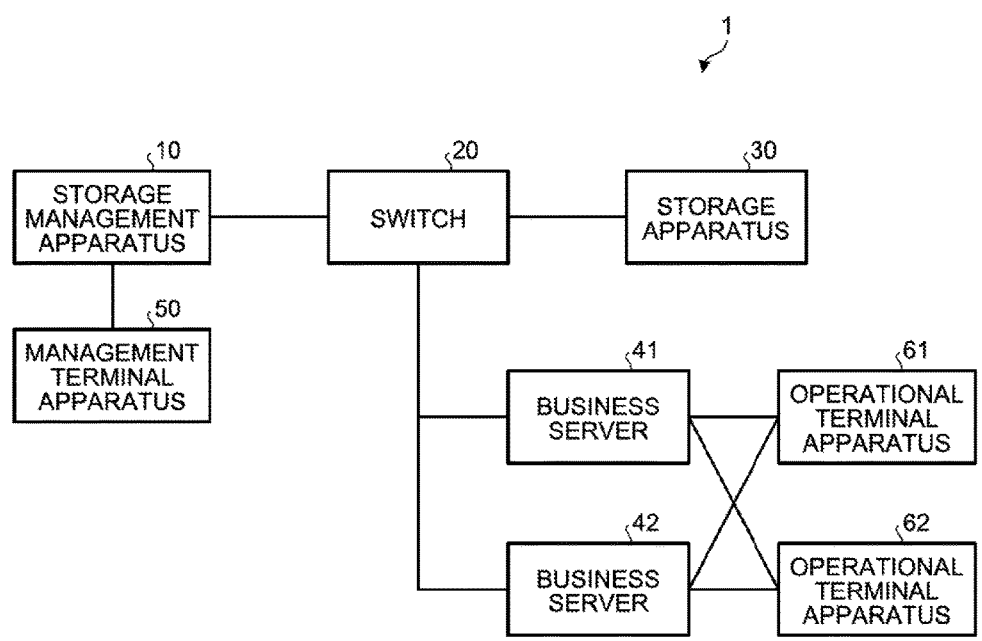
FIG. 1 is a diagram illustrating a configuration of a storage system.

FIG. 1 is a diagram illustrating a configuration of a storage system. A storage system 1 to be described below includes a storage management apparatus 10, a switch 20, a storage apparatus 30, business servers 41 and 42, a management terminal apparatus 50, and operational terminal apparatuses 61 and 62.

The storage apparatus 30 are connected with the business servers 41 and 42, via the switch 20. Moreover, the storage management apparatus 10 is connected with the storage apparatus 30 and with the business servers 41 and 42, via the switch 20. The business servers 41 and 42 are connected with the operational terminal apparatuses 61 and 62. Moreover, the storage management apparatus 10 is connected with the management terminal apparatus 50.

The operational terminal apparatuses 61 and 62 are terminal apparatuses used by a user who receives a service from the business servers 41 and 42. Hereinafter, the operational terminal apparatuses 61 and 62 will be referred to as an "operational terminal apparatus 60" when they need not be distinguished from each other. Note that while FIG. 1 illustrates two operational terminal apparatuses 60, there is no limitation to the number. The operational terminal apparatus 60 receives an instruction from a user and performs data input and processing request input toward the business servers 41 and 42. In addition, the operational terminal apparatus 60 provides service to the user, for example, by obtaining and outputting information on processing results from the business servers 41 and 42.

The business servers 41 and 42 are servers for providing services to the user of the operational terminal apparatus 60. The business servers 41 and 42 may provide a same service or different services. Hereinafter, the business servers 41 and 42 will be referred to as a "business server 40" when they need not be distinguished from each other. Note that while FIG. 1 illustrates two business servers 40, there is no limitation to the number.

The business server 40 receives, for example, a processing request related to business from the operational terminal apparatus 60. Then, the business server 40 executes processing in response to the processing request in cooperation with the storage apparatus 30, and transmits information on results of processing to the operational terminal apparatus 60. For example, at the time of execution of processing, the business server 40 transmits read commands and write commands to the storage apparatus 30 via the switch 20. Moreover, in the case a read command, the business server 40 receives designated data from the storage apparatus 30 via the switch 20. Moreover, in the case of a write command, the business server 40 receives a writing completion response from the storage apparatus 30 via the switch 20.

The business server 40 includes, for example, a central processing unit (CPU), a memory, and a hard disk. Specifically, the CPU as a calculation processing unit executes various types of processing using a memory as a main storage apparatus. The business server 40 is an exemplary "information processing apparatus".

The storage apparatus 30 includes a disk control apparatus and a hard disk. Hard disks constitute, for example, a redundant array of inexpensive disks (RAID) group. The RAID group includes volumes, each of which is a logical storage region. Each of the volumes is allocated to the business server 40. In other words, the business server 40 uses the volume allocated from the storage apparatus 30, as a storage region. Note that the storage apparatus 30 may include a solid state drive (SSD) instead of the hard disk.

The storage apparatus 30 receives a read command and a write command from the business server 40 via the switch 20. The storage apparatus 30 adjusts the bandwidth after receiving an instruction to adjust the bandwidth of a volume from the storage management apparatus 10.

Upon receiving an instruction from an application operating on the business server 40, the storage apparatus 30 performs reading and writing of data. In case of a read command, the storage apparatus 30 reads designated data from the volume allocated to the business server 40 that transmitted the command. Thereafter, the storage apparatus 30 transmits the read data to the business server 40 via the switch 20. Moreover, in the case of a write command, the storage apparatus 30 writes the designated data into the volume allocated to the business server 40 that transmitted the command. Thereafter, the storage apparatus 30 transmits a write completion response to the business server 40 via the switch 20.

The storage management apparatus 10 is an apparatus that manages the storage apparatus 30. An exemplary storage management apparatus 10 is a server. The storage management apparatus 10 includes a CPU, a memory, and a hard disk.

Specifically, the storage management apparatus 10 controls QoS, or the like, on the storage apparatus 30. For example, the storage management apparatus 10 executes quality of service (QoS) evaluation processing toward the storage apparatus 30. QoS is a performance setting function to enable the storage apparatus 30 to maintain stable performance, including adjustment of volume bandwidth, or the like, to be described below. For example, the storage management apparatus 10 performs target value setting for bandwidth adjustment, toward the volume included in the storage apparatus 30. Then, the storage management apparatus 10 obtains performance information such as throughput, input output per second (IOPS), and a response time, from the storage apparatus 30, and adjusts the bandwidth so as to control it within the set target value. The processing of obtaining the performance information and of adjusting the bandwidth so as to control it within the target value is referred to as "QoS evaluation processing".

Moreover, the storage management apparatus 10 follows a command input from the management terminal apparatus 50 and controls the storage apparatus 30. For example, the storage management apparatus 10 receives an instruction from the user from the management terminal apparatus 50 and instructs the storage apparatus 30 to constitute a RAID group. Moreover, before actual operation using QoS, the storage management apparatus 10 obtains performance information on the storage apparatus 30 in a case where the target value is temporarily set. This operation, by the storage management apparatus 10, of obtaining performance information on the storage apparatus 30 in a state where the target value is temporarily set before actual operation is referred to as "learning". This information is provided to the user as auxiliary information for setting the target value.

Figure 2:
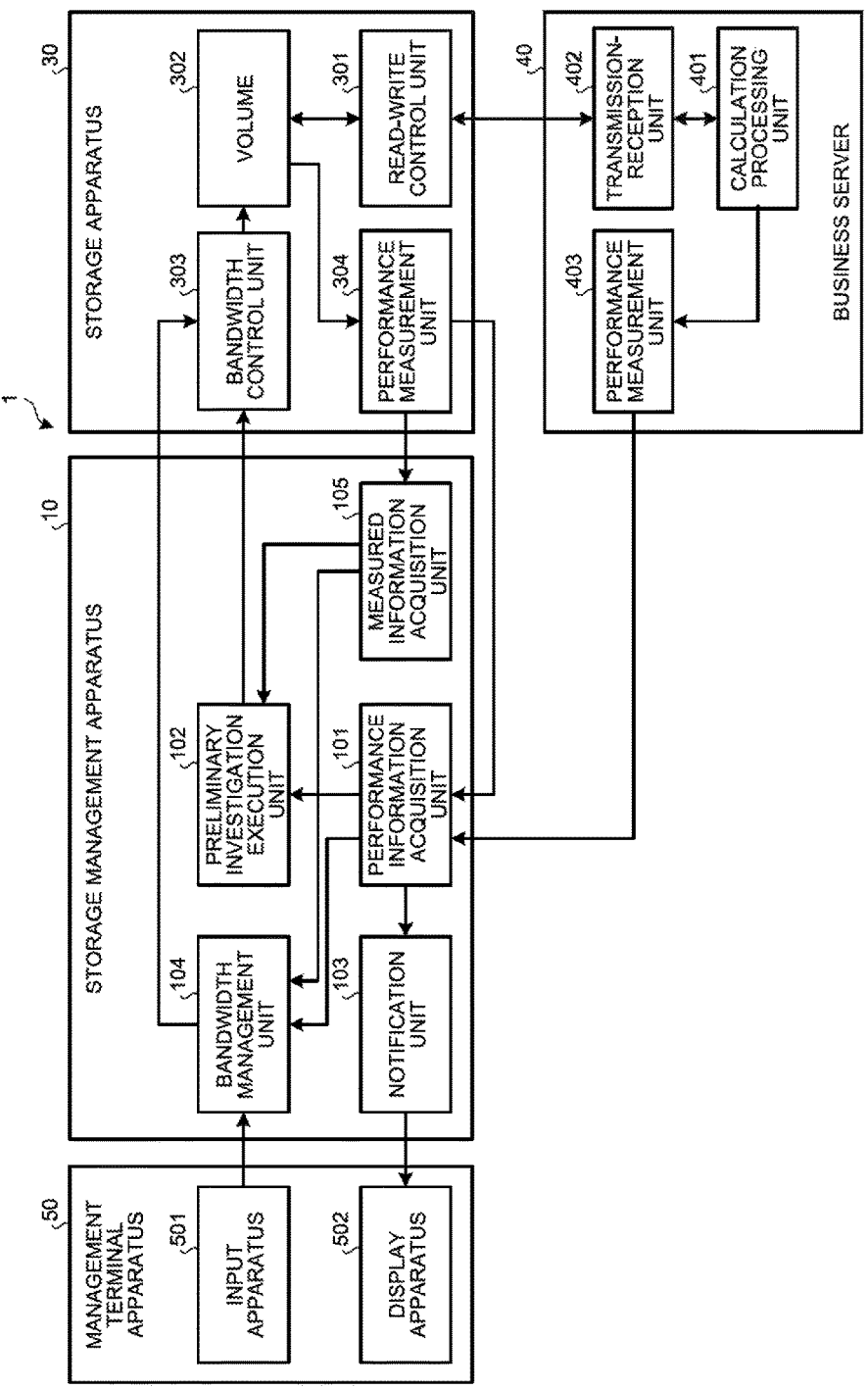
FIG. 2 is a block diagram of a storage system according to a first exemplary embodiment.

Next, setting of the target value toward the storage apparatus 30 by the storage management apparatus 10 will be described with reference to FIG. 2. FIG. 2 is a block diagram of a storage system according to a first exemplary embodiment. Herein, note that, while the storage management apparatus 10, the storage apparatus 30, and the business server 40 actually perform mutual communication via the switch 20, the following description will assume, for convenience of explanation, that each of the storage management apparatus 10, the storage apparatus 30, and the business server 40 performs direct communication.

The storage management apparatus 10 includes a performance information acquisition unit 101, a preliminary investigation execution unit 102, a notification unit 103, a bandwidth management unit 104, and a measured information acquisition unit 105. Various programs including programs to implement each of functions of the performance information acquisition unit 101, the preliminary investigation execution unit 102, the notification unit 103, the bandwidth management unit 104, and the measured information acquisition unit 105, are stored in a hard disk included in the storage management apparatus 10. The CPU included in the storage management apparatus 10 reads various programs from the hard disk, expands the programs on the memory, and executes the programs, whereby each of the functions of the performance information acquisition unit 101, the preliminary investigation execution unit 102, the notification unit 103, the bandwidth management unit 104, and the measured information acquisition unit 105 is implemented.

The performance information acquisition unit 101 includes information on a performance measurement period and a unit of time of information collection. The performance measurement period is a period in which target values while being changed are sequentially set onto the storage apparatus 30 temporarily and performance information in a state where each of the target values is set is obtained. Moreover, the unit of time of information collection is a period for setting a specific target value onto the storage apparatus 30 and to obtain performance information. The unit of time of information collection corresponds to an exemplary "predetermined time". In the present exemplary embodiment, the performance information acquisition unit 101 assumes a day as the performance measurement period and assumes 10 minutes as the unit of time of information collection. Moreover, a value that corresponds to a performance setting value that is the information used by a user for the target value setting, to be described below, is used as the target value.

The performance information acquisition unit 101 obtains performance information of the volume allocated to the business server 40 for the unit of time of information collection in the performance measurement period, from a performance measurement unit 304 of the storage apparatus 30, in a state where no target value is set. Here, the performance information of a volume allocated to the business server 40 corresponds to, for example, the response time and the data size of the volume at a certain time. The data size of a volume represents the data size of the data that was transmitted or received at a certain time toward the volume. Then, the performance information acquisition unit 101 calculates an average value of the response time and the data size of the volume for the unit of time of information collection. Hereinafter, the performance information of the volume allocated to the business server 40 will be simply referred to as "volume performance information". Moreover, the performance information of the volume for the unit of time of information collection in the performance measurement period, collected in a state where no target value is set, will be referred to as a "pre-adjustment performance value". The pre-adjustment performance value corresponds to an exemplary "first performance information".

Upon completion of collection of performance information of the volume allocated to the business server 40 for the unit of time of information collection in the performance measurement period, the performance information acquisition unit 101 instructs the preliminary investigation execution unit 102 to execute target value setting.

Then, after each of target values is set by the preliminary investigation execution unit 102, the performance information acquisition unit 101 obtains performance information of the business server 40 for the unit of time of information collection for each of the target values, from a performance measurement unit 403. Moreover, the performance information acquisition unit 101 obtains performance information of a volume at the unit of time of information collection for each of the target values, from the performance measurement unit 403 of the business server 40. Here, the performance information of the business server 40 corresponds to, for example, a CPU usage rate and a memory usage rate of the business server 40 at a specific time in the unit of time of information collection. Then, the performance information of the business server 40 and the performance information of the volume allocated to the business server 40 correspond to exemplary "performance information regarding an information processing apparatus".

The performance information acquisition unit 101 may collect other information as the performance information of the business server 40. Hereinafter, the performance information of the business server 40 and the volume for the unit of time of information collection in the performance measurement period, collected in a state where the target value is temporarily set, will be referred to as a "post-adjustment performance value". The post-adjustment performance value corresponds to a "second performance information".

Note that the performance information acquisition unit 101 includes beforehand a threshold for the performance information of the business server 40 in order to determine a high load state of the business server 40. In the present exemplary embodiment, the performance information acquisition unit 101 assumes 90% as a threshold for any of the CPU usage rate and the memory usage rate. In a case where the performance information of the business server 40, obtained from the performance measurement unit 403, exceeds the threshold, the performance information acquisition unit 101 stops collection of performance information of the business server 40 and the volume with changing target values. Furthermore, the performance information acquisition unit 101 notifies completion of target value setting to the preliminary investigation execution unit 102. In this case, the storage management apparatus 10 finishes learning.

Moreover, when the performance measurement period elapsed with the performance information of the business server 40 not exceeding the threshold, the performance information acquisition unit 101 notifies completion of target value setting to the preliminary investigation execution unit 102. Then, the performance information acquisition unit 101 generates a performance information table 111 as illustrated in FIG. 3 using the collected pre-adjustment performance value and post-adjustment performance value. FIG. 3 is a diagram illustrating an exemplary performance information table. As illustrated in FIG. 3, performance information is registered on the performance information table 111 for each of time zones representing the individual unit of time of information acquisition in the performance measurement period. For example, a used performance setting value, throughputs before/after implementation of target setting, comparison between throughput before implementation of target setting and throughput after implementation of target setting, the CPU usage rate, and the memory usage rate, are registered onto the performance information table 111, for each of the time zones. The comparison between the throughput before implementation of target setting and the throughput after implementation of target setting is represented by the ratio of the throughput after implementation of target setting with respect to the throughput before implementation of target setting. Subsequently, the performance information acquisition unit 101 transmits the generated performance information table 111 to the notification unit 103.

The preliminary investigation execution unit 102 includes, for example, a performance setting value table 121 illustrated in FIG. 4 beforehand. FIG. 4 is a diagram illustrating an exemplary performance setting value table. The performance setting value is a value used by a user when the user sets a target value toward the storage apparatus 30. The performance setting value table 121 is a table indicating sets of IOPS and throughput target values with respect to the performance setting values. That is, the user determines a performance setting value as a desired target value and inputs the determined performance setting value using the management terminal apparatus 50. With the input of this, a target value corresponding to the performance setting value input into the storage apparatus 30 is set onto the storage apparatus 30. Moreover, the preliminary investigation execution unit 102 stores the unit of time of information acquisition beforehand.

The preliminary investigation execution unit 102 receives an instruction of execution of target value setting, from the performance information acquisition unit 101. Subsequently, the preliminary investigation execution unit 102 sequentially selects performance setting values. In the present exemplary embodiment, sequential numbers are given to the performance setting values. Accordingly, the preliminary investigation execution unit 102 selects performance setting values in ascending order, and after selecting the maximum performance setting value, selects the performance setting values in descending order. The preliminary investigation execution unit 102 repeats selecting performance setting values in descending and ascending orders.

The preliminary investigation execution unit 102 obtains a target value in accordance with the selected performance setting value, from the performance information table 111. Subsequently, the preliminary investigation execution unit 102 sets the obtained target value onto a volume 302 of the storage apparatus 30.

The preliminary investigation execution unit 102 obtains measured performance including IOPS and throughput of the volume 302, from the measured information acquisition unit 105. Subsequently, the preliminary investigation execution unit 102 compares the measured performance with the set target value. In a case where the set target value is lower than the measured performance, the preliminary investigation execution unit 102 instructs expansion of the bandwidth of the volume 302 to a bandwidth control unit 303. In contrast, in a case where the set target value is higher than the measured performance, the preliminary investigation execution unit 102 instructs reduction of the bandwidth of the volume 302 to a bandwidth control unit 303. This adjustment of the bandwidth based on the target value is referred to as "QoS evaluation processing".

The preliminary investigation execution unit 102 repeats QoS evaluation processing until the unit of time of information acquisition elapsed after target value setting. When the unit of time of information acquisition elapsed after target value setting, the preliminary investigation execution unit 102 performs setting of a target value in accordance with a next performance setting value and executes QoS evaluation processing.

Thereafter, the preliminary investigation execution unit 102 receives a notification of completion of target value setting from the performance information acquisition unit 101. Then, the preliminary investigation execution unit 102 finishes selection of the performance setting value, setting of the target value in accordance with the selected performance setting value, and QoS evaluation processing. The preliminary investigation execution unit 102 corresponds to an exemplary "first bandwidth adjustment unit".

The notification unit 103 receives the performance information table 111 from the performance information acquisition unit 101. Subsequently, the notification unit 103 transmits the performance information table 111 to the management terminal apparatus 50, displays it on a display apparatus 502, or the like, and notifies a result of learning to the administrator. The administrator refers to a result of learning notified from the notification unit 103, and thereafter, inputs information of the performance setting value using the management terminal apparatus 50. The input of the performance setting value using the management terminal apparatus 50 by the administrator corresponds to an exemplary "input of the specific target value after notification".

The bandwidth management unit 104 includes the performance information table 111. The bandwidth management unit 104 receives information of the performance setting value designated by the administrator, from an input apparatus 501 of the management terminal apparatus 50. Next, the bandwidth management unit 104 obtains the target value corresponding to the received performance setting value, from the performance information table 111. Subsequently, the bandwidth management unit 104 sets the obtained target value onto the volume 302. The stage in which the target value designated by the administrator is set onto the volume 302 by the bandwidth management unit 104 and QoS evaluation processing is executed is referred to as an "operation stage".

The bandwidth management unit 104 obtains measured performance including IOPS and throughput of the volume 302, from the measured information acquisition unit 105. Subsequently, the bandwidth management unit 104 compares the measured performance with the set target value and executes QoS evaluation processing. The bandwidth management unit 104 corresponds to an exemplary "second bandwidth adjustment unit".

The measured information acquisition unit 105 receives the measured performance including IOPS and throughput of the volume 302 from the performance measurement unit 304 of the storage apparatus 30. Then, in the case of learning stage, the measured information acquisition unit 105 transmits received measured performance to the preliminary investigation execution unit 102. In contrast, in the case of the operation stage, the measured information acquisition unit 105 transmits received measured performance to the bandwidth management unit 104.

The management terminal apparatus 50 includes the input apparatus 501 and the display apparatus 502. The input apparatus 501 includes an input unit such as a keyboard and a mouse. Moreover, the display apparatus 502 includes a display unit such as a monitor.

The display apparatus 502 receives the performance information table 111 from the notification unit 103 of the storage management apparatus 10. Then, the display apparatus 502 displays the performance information table 111 on the display unit and provides the performance information table 111 to the administrator.

The administrator refers to the performance information table 111 displayed on the display unit of the display apparatus 502. The administrator determines beforehand the degree of performance desired for each of the storage apparatus 30 and the business server 40 on each of the time zones among the performance measurement period. Subsequently, an operator specifies a performance setting value that satisfies the desired performance of the storage apparatus 30 and the business server 40 in each of the performance measurement periods. For example, one performance setting value is specified on the performance information table 111, for each of the periods in which the performance setting value transitions from zero to 15 and thereafter returns to zero. Then, the administrator transmits the information of the performance setting value specified using the input apparatus 501, to the bandwidth management unit 104.

The storage apparatus 30 includes a read-write control unit 301, the volume 302, a bandwidth control unit 303, and the performance measurement unit 304. Various programs including programs to implement each of functions of the read-write control unit 301, the bandwidth control unit 303, and the performance measurement unit 304, are stored in a hard disk included in the storage apparatus 30. The CPU included in the storage apparatus 30 reads various programs from the hard disk, expands the programs on the memory, and executes the programs, whereby each of the functions of the read-write control unit 301, the bandwidth control unit 303, and the performance measurement unit 304, is implemented.

The volume 302 is, for example, a part of regions of the RAID group constituted by hard disks. The volume 302 is a volume allocated to the business server 40. Note that, while FIG. 2 includes one volume 302, the number is not limited to this example. The storage apparatus 30 may include a plurality of volumes 302 allocated to one business server 40, and the business server 40 that receives allocation may include a plurality of different volumes 302.

The read-write control unit 301 receives a read command and a write command from a transmission-reception unit 402 of the business server 40. In case of a read command, the read-write control unit 301 reads designated data from the volume 302 and transmits the read data to the transmission-reception unit 402 of the business server 40. Moreover, in the case of a write command, the read-write control unit 301 writes data into the volume 302. Thereafter, the read-write control unit 301 transmits a response of completion of writing to the transmission-reception unit 402.

The bandwidth control unit 303 receives an instruction of expansion or reduction of the bandwidth of the volume 302 from the preliminary investigation execution unit 102 or the bandwidth management unit 104. The bandwidth control unit 303 expands or reduces the bandwidth of the volume 302 in accordance with the instruction of expansion or reduction of the bandwidth. For example, the bandwidth control unit 303 performs a predetermined amount of expansion or reduction toward the bandwidth of the volume 302.

The performance measurement unit 304 monitors the volume 302 and periodically obtains performance information including response time and data size of the volume 302. Then, the performance measurement unit 304 transmits the obtained performance information of the volume 302 to the performance information acquisition unit 101 of the storage management apparatus 10.

Moreover, the performance measurement unit 304 monitors the volume 302 and periodically obtains measured performance, including IOPS and throughput, of the volume 302. Then, the performance measurement unit 304 transmits the obtained measured performance of the volume 302 to the measured information acquisition unit 105 of the storage management apparatus 10.

The business server 40 includes a calculation processing unit 401, the transmission-reception unit 402, and the performance measurement unit 403. Various programs including programs to implement each of functions of the calculation processing unit 401, the transmission-reception unit 402, and the performance measurement unit 403, are stored in the hard disk included in the business server 40. The CPU included in the business server 40 reads various programs from the hard disk, expands the programs on the memory, and executes the programs, whereby each of the functions of the calculation processing unit 401, the transmission-reception unit 402, and the performance measurement unit 403, is implemented.

The calculation processing unit 401 executes calculation processing. In a case where data read or write toward the volume 302 of the storage apparatus 30 is performed in execution of calculation processing, the calculation processing unit 401 transmits a data read command or a data write command to the transmission-reception unit 402.

The transmission-reception unit 402 transmits the data read command or the data write command received from the calculation processing unit 401 to the read-write control unit 301 of the storage apparatus 30. Moreover, the transmission-reception unit 402 transmits data as a response to the read command received from the read-write control unit 301, or transmits a response of completion of writing as a response toward the write command, to the calculation processing unit 401.

The performance measurement unit 403 monitors states of the CPU and the memory each of which implements the function of the calculation processing unit 401. Subsequently, the performance measurement unit 403 obtains the usage rate of each of the CPU and the memory. The performance measurement unit 403 transmits the obtained usage rate of each of the CPU and the memory, to the performance information acquisition unit 101.

Figure 5:
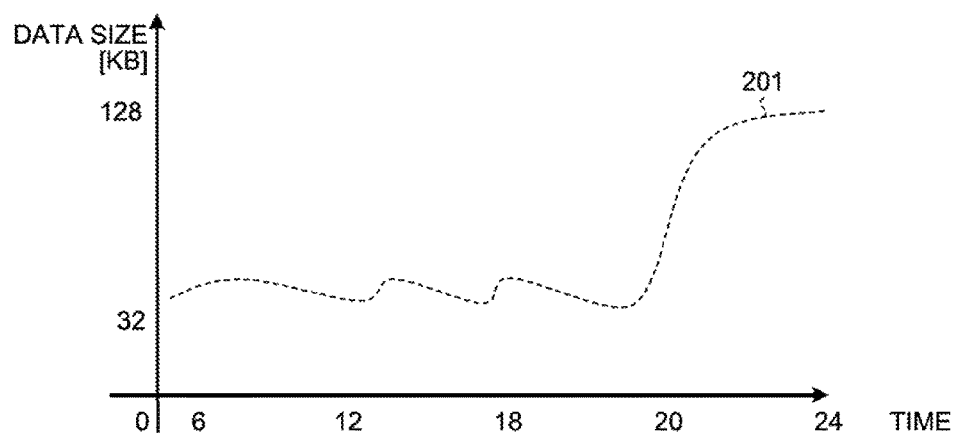
FIG. 5 is a diagram illustrating data size of a volume before target value setting.
Figure 6:
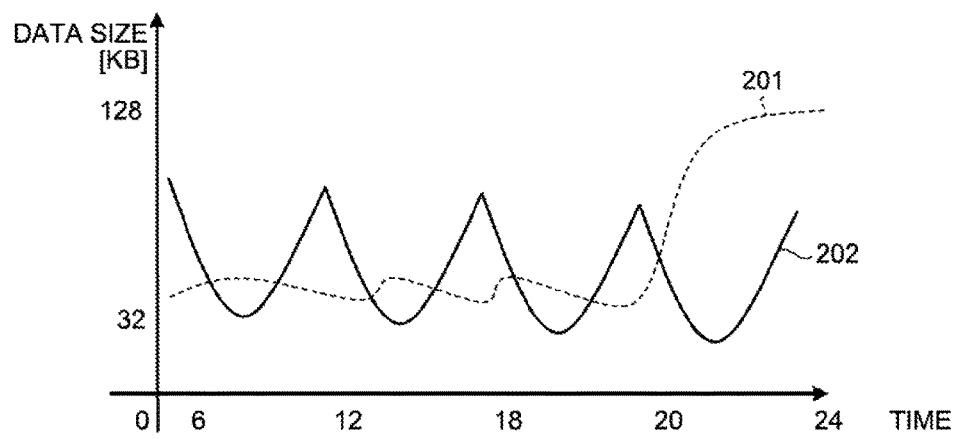
FIG. 6 is a diagram illustrating a target value set at the time of learning.

Next, target value setting at the time of learning will be described with reference to FIGS. 5 and 6. FIG. 5 is a diagram illustrating data size of a volume before target value setting. FIG. 6 is a diagram illustrating a target value set at the time of learning. In FIGS. 5 and 6, the vertical axis represents the data size, and the horizontal axis represents the time.

For example, it is assumed that the volume 302 changes its data size in a day as illustrated in a graph 201 in FIG. 5. Specifically, the data size of the volume 302 is approximately 32 KB in average during the time 00:00 to 20:00. In contrast, the data size of the volume 302 increases after the time 20:00, up to 128 KB. In this manner, the volume 302 changes its data size depending on the time. Accordingly, in a case where the target value takes a same value for all day, the target value might be inappropriate depending on the time zone.

To cope with this, using learning processing executed by the performance information acquisition unit 101 and the preliminary investigation execution unit 102, target values that differ depending on individual time zones are sequentially set as illustrated in a graph 202 in FIG. 6. In this case, it would be easy to achieve the set target value during the time 00:00 to 20:00 even when the target value is suppressed to a low level. That is, even on the performance information table 111, the response time after implementation of target value setting would not drop so much even when the performance setting value that is a low target value is used. In contrast, at the time 20:00 or later, in a case where a low target value is set, it would be difficult to achieve the target value and at the same time, performance of the storage apparatus 30 might be degraded significantly. That is, even on the performance information table 111, the response time after implementation of target value setting would drop significantly in a case where the performance setting value that is a low target value is used.

To cope with this, by referring to the performance information table 111 generated on the basis of learning of performing target value setting as illustrated in FIG. 6, the administrator can set the target value such that the values are set to low levels during the time 00:00 to 20:00 and the values are gradually set to higher levels at the time 20:00 or later. In this manner, by performing learning regarding the performance of the storage apparatus 30 beforehand, it is possible to provide information helpful in target value setting to the administrator, and thus, the administrator can use the information and appropriately set the target value.

Figure 7:
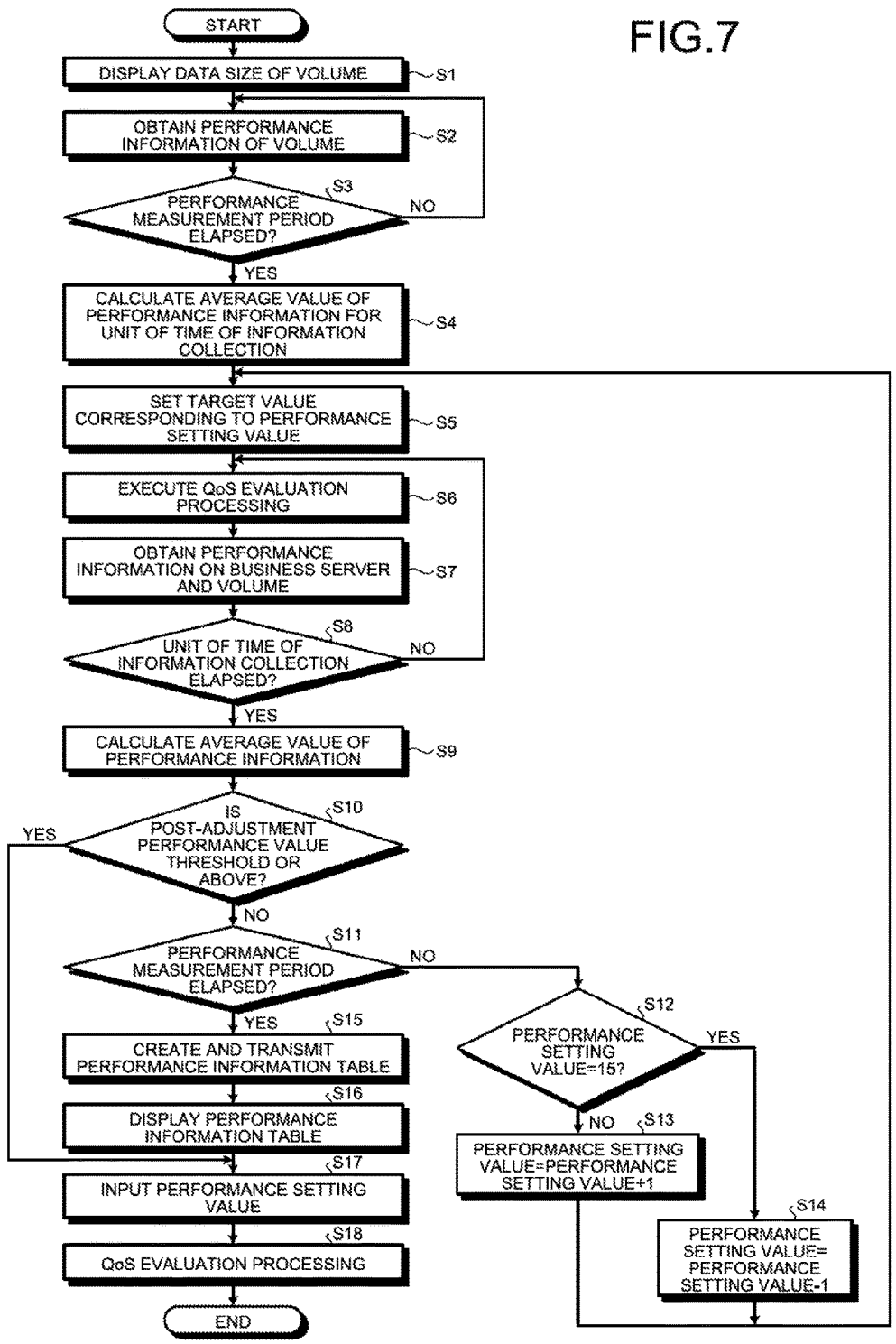
FIG. 7 is a flowchart of learning processing performed by a storage management apparatus according to the first exemplary embodiment.

Next, a flow of learning processing using the storage management apparatus 10 according to the present exemplary embodiment will be described with reference to FIG. 7. FIG. 7 is a flowchart of learning processing performed by a storage management apparatus according to the first exemplary embodiment.

The performance measurement unit 304 obtains performance information including response time and data size of the volume 302 and transmits the obtained performance information to the performance information acquisition unit 101. The performance information acquisition unit 101 transmits information on a daily change in the data size of the volume 302 to the notification unit 103. The information on a daily change in the data size of the volume 302 is information such as the graph 201 illustrated in FIG. 5, for example. The notification unit 103 displays the information on a daily change in the data size of the volume 302 on the display apparatus 502 of the management terminal apparatus 50 (step S1). The administrator grasps that the data size change is great with reference to the data size change of the volume 302. Then, the administrator instructs start of learning to the storage management apparatus 10 using the input apparatus 501.

The storage management apparatus 10 receives the instruction to start learning. The performance information acquisition unit 101 obtains performance information including response time and data size of the volume 302 from the performance measurement unit 304 (step S2).

The performance information acquisition unit 101 determines whether the performance measurement period has elapsed after receiving the instruction to start learning (step S3). In a case where the performance measurement period has not elapsed (step S3: No), the performance information acquisition unit 101 returns to step S2.

In contrast, in a case where the performance measurement period has elapsed (step S3: Yes), the performance information acquisition unit 101 calculates an average value of performance information for the unit of time of information collection and obtains a pre-adjustment performance value (step S4).

Next, the performance information acquisition unit 101 instructs target value setting to the preliminary investigation execution unit 102. The preliminary investigation execution unit 102 receives an instruction of target value setting from the performance information acquisition unit 101. Then, the preliminary investigation execution unit 102 obtains a target value corresponding to the performance setting value, from the performance setting value table 121. Here, the preliminary investigation execution unit 102 uses zero as an initial value of the performance setting value. Subsequently, the preliminary investigation execution unit 102 sets the target value corresponding to the performance setting value onto the volume 302 (step S5).

The preliminary investigation execution unit 102 obtains measured performance, including IOPS and throughput, of the volume 302 from the measured information acquisition unit 105, compares it with the target value, and executes QoS evaluation processing (step S6).

The performance information acquisition unit 101 obtains performance information, including the CPU usage rate and memory usage rate, of the business server 40 from the performance measurement unit 403 of the business server 40. Moreover, the performance information acquisition unit 101 obtains performance information including response time and data size of the storage apparatus 30 from the performance measurement unit 304 of the storage apparatus 30 (step S7).

Subsequently, the performance information acquisition unit 101 determines whether the unit of time of information collection has elapsed (step S8). In a case where the unit of time of information collection has not elapsed (step S8: No), the performance information acquisition unit 101 and the preliminary investigation execution unit 102 return to step S6.

In contrast, in a case where the unit of time of information collection has elapsed (step S8: Yes), the performance information acquisition unit 101 calculates an average value of performance information of the storage apparatus 30 and the business server 40 on the elapsed unit of time of information collection, and obtains the post-adjustment performance value (step S9).

Subsequently, the performance information acquisition unit 101 determines whether the calculated post-adjustment performance value is a threshold or above (step S10). In a case where the post-adjustment performance value is the threshold or above (step S10: Yes), the performance information acquisition unit 101 notifies completion of target value setting to the preliminary investigation execution unit 102. Subsequently, the performance information acquisition unit 101 and the preliminary investigation execution unit 102 finish learning processing and proceed to step S17.

In contrast, in a case where the post-adjustment performance value is below the threshold (step S10: No), the performance information acquisition unit 101 determines whether the performance measurement period has elapsed (step S11). In a case where the performance measurement period has not elapsed (step S11: No), the preliminary investigation execution unit 102 determines whether the performance setting value reaches the maximum value of 15 (step S12).

In a case where the performance setting value has not reached 15 (step S12: No), the preliminary investigation execution unit 102 increments the performance setting value by one (step S13) and returns to step S5.

In contrast, in a case where the performance setting value has reached 15 (step S12: Yes), the preliminary investigation execution unit 102 decrements the performance setting value by one (step S14) and returns to step S5.

In contrast, in a case where the performance measurement period has elapsed (step S11: Yes), the performance information acquisition unit 101 creates the performance information table 111 using the obtained pre-adjustment performance value and the post-adjustment performance value. Subsequently, the performance information acquisition unit 101 transmits the created performance information table 111 to the notification unit 103. The notification unit 103 transmits the performance information table 111 to the management terminal apparatus 50 (step S15).

The display apparatus 502 of the management terminal apparatus 50 receives the performance information table 111 from the notification unit 103. Subsequently, the display apparatus 502 displays the performance information table 111 on the display unit (step S16).

The administrator determines the performance setting value for each of time zones with reference to the performance information table 111 displayed on the display apparatus 502. Then, using the input apparatus 501, the administrator inputs the performance setting value for each of time zones to the bandwidth management unit 104 of the storage management apparatus 10 (step S17).

The bandwidth management unit 104 of the storage management apparatus 10 receives input of the performance setting value for each of time zones from the input apparatus 501 of the management terminal apparatus 50. Subsequently, using the performance setting value table 121, the bandwidth management unit 104 sets the target value corresponding to the performance setting value onto the volume 302 for each of time zones and executes QoS evaluation processing (step S18).

As described above, the storage management apparatus according to the present exemplary embodiment executes QoS evaluation processing with changing target values, and performs learning by repeating acquisition of performance information on the business server and the storage apparatus for the performance measurement period. Then, the storage management apparatus provides pre-adjustment performance information and the post-adjustment performance information, for each of time zones, which are obtained through learning, to the administrator. With this information, the administrator can easily grasp an appropriate target value for each of time zones and can easily perform target value setting in accordance with an operation status of the storage apparatus. Moreover, it is possible to provide effects of QoS to the administrator in advance, enabling the administrator to perform more appropriate target value setting. Accordingly, it is possible to appropriately perform adjustment of the bandwidth in accordance with the operation status of the storage apparatus.

Moreover, the storage management apparatus according to the present exemplary embodiment stops learning processing in a case where the business server turns into a high load state. With this configuration, it is possible to avoid uselessly performing learning processing and to reduce the load on the storage management apparatus and the storage apparatus.

[b] Second Embodiment

Figure 8:
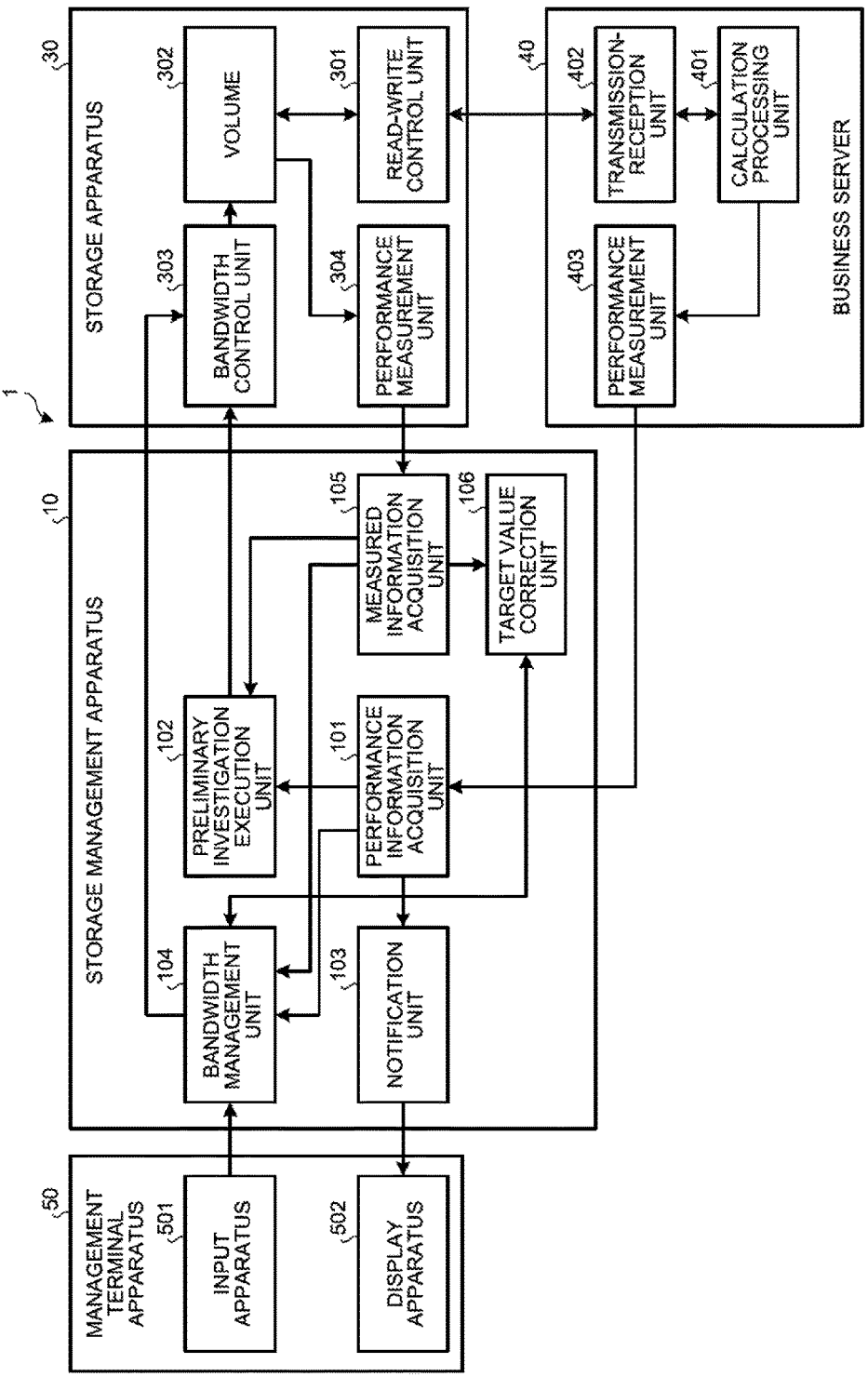
FIG. 8 is a block diagram of a storage system according to a second exemplary embodiment.

FIG. 8 is a block diagram of a storage system according to a second exemplary embodiment. The storage management apparatus 10 according to the present exemplary embodiment includes a target value correction unit 106, in addition to the components of the first exemplary embodiment. The storage management apparatus 10 according to the present exemplary embodiment differs from the case of the first exemplary embodiment in that it performs correction of the target value on the basis of measured information.

Hereinafter, correction of target values will be mainly described. Note that, in the following description, description will be omitted for operations of the component similar to the case of the first exemplary embodiment.

Herein, description will be given with an exemplary case where the administrator designates a performance setting value and the storage management apparatus 10 executes QoS evaluation processing using the target value corresponding to the performance setting value.

The measured information acquisition unit 105 obtains measured performance, including IOPS, throughput, and response time, of the volume 302 from the performance measurement unit 304 of the storage apparatus 30. Furthermore, the measured information acquisition unit 105 obtains a measured cache hit rate measured at the time of performing data reading/writing toward the volume 302. Subsequently, the measured information acquisition unit 105 transmits the performance information of the volume 302 to the bandwidth management unit 104 and the target value correction unit 106. Moreover, the measured information acquisition unit 105 transmits the measured cache hit rate of the volume 302 to the target value correction unit 106.

The target value correction unit 106 includes beforehand an equation for performing correction of the target value, represented by the following Formula (1). Herein, description will be given on a case where the response time is used as the performance information.

$$\frac{\text{Measured data size}}{\text{Reference data size}}\{(\text{Target value} - \text{Constant 1}) + \text{Constant 1}\} \times \quad (1)$$
$$\{\text{Measured cache hit rate} \times \text{Constant 2} +$$
$$(1 - \text{Measured cache hit rate}) \times 1\}$$

The target value is a current target value set by the bandwidth management unit 104. Moreover, the measured data size is a value obtained by dividing the measured throughput by the measured IOPS. As a reference data size, the data size of the volume 302 for each of time zones, obtained as the pre-adjustment performance value, is to be used. Moreover, a constant 1 is a value representing a portion that does not depend upon the data size, among the response time. Moreover, a constant 2 is a ratio of the disk access speed at the time of cache hit to the disk access speed at the time of cache miss. While each of the constants 1 and 2 differs for individual models and environments of the storage apparatus 30 and the business server 40, it would be allowable to apply a measured value measured under a specific environment using a specific model, regardless of models and environments.

The target value correction unit 106 receives performance information and the measured cache hit rate of the volume 302 from the measured information acquisition unit 105. Moreover, the target value correction unit 106 obtains a current target value from the bandwidth management unit 104.

Subsequently, the target value correction unit 106 corrects the target value by applying, for Formula (1), an obtained current target value, performance information and the measured cache hit rate of the volume 302 and calculates the corrected target value. Thereafter, the target value correction unit 106 transmits the corrected target value to the bandwidth management unit 104.

The bandwidth management unit 104 obtains the target value corresponding to the performance setting value input from the input apparatus 501, from the performance setting value table 121. Subsequently, the bandwidth management unit 104 sets the obtained target value onto the volume 302. Thereafter, the bandwidth management unit 104 performs QoS evaluation processing using the measured performance and target value of the volume 302, obtained from the measured information acquisition unit 105.

Moreover, the bandwidth management unit 104 transmits the target value set onto the volume 302, to the target value correction unit 106. In a case where the corrected target value is received from the target value correction unit 106 during implementation of the QoS evaluation processing, the bandwidth management unit 104 performs QoS evaluation processing using the received corrected target value.

As described above, the storage management apparatus according to the present exemplary embodiment calculates the corrected target value using the data size for each of the time zones of the volume obtained beforehand as a reference data size, and performs QoS evaluation processing using the corrected target value. In this respect, it is possible to perform correction of the target value more appropriate to the actual operation status of the server compared with the case of using a fixed value predetermined as a reference data size. Accordingly, it is possible to further appropriately perform adjustment of the bandwidth in accordance with the operation status of the storage apparatus.

[c] Third Embodiment

Figure 9:
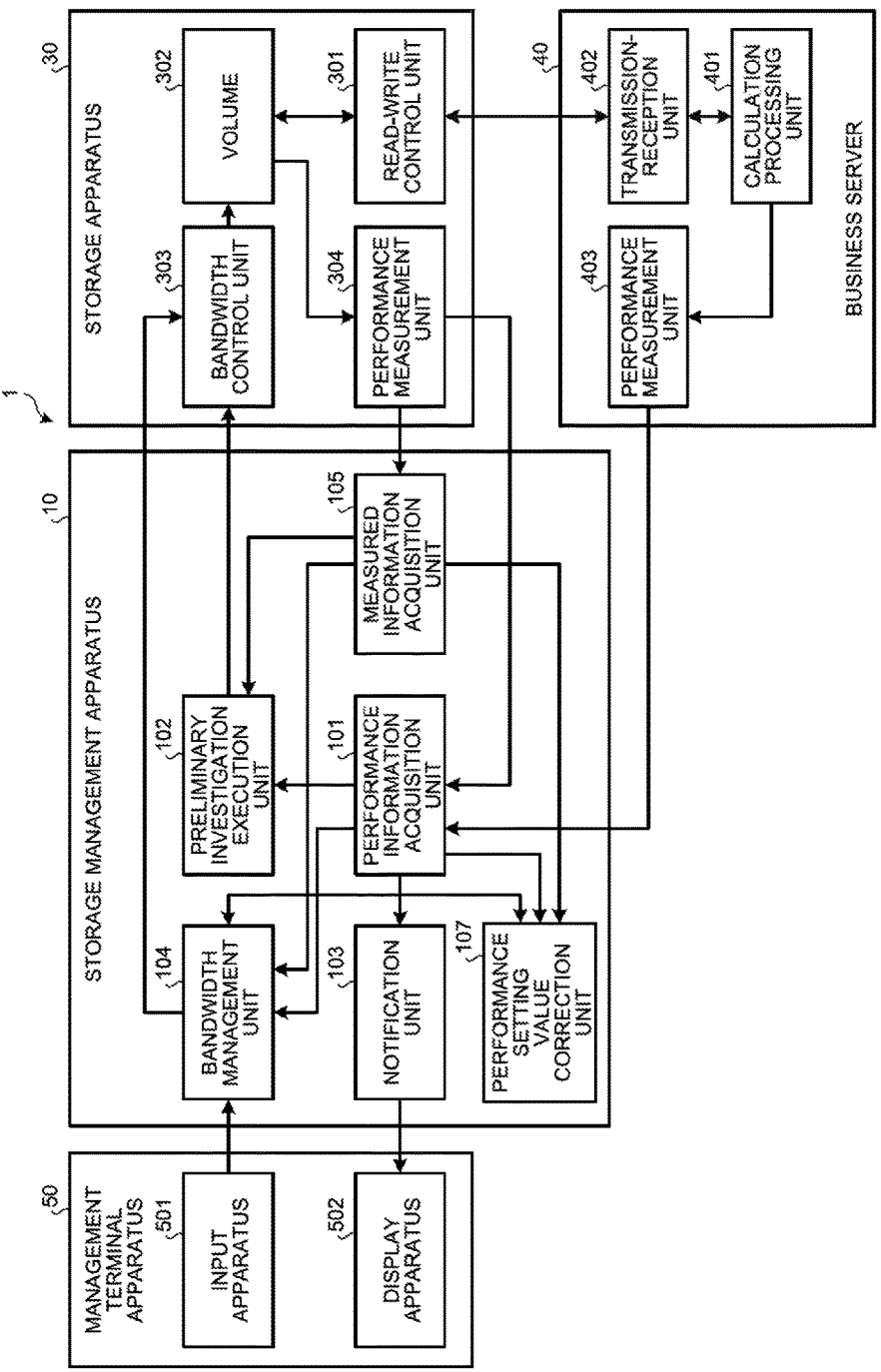
FIG. 9 is a block diagram of a storage system according to a third exemplary embodiment.

FIG. 9 is a block diagram of a storage system according to a third exemplary embodiment. The storage management apparatus 10 according to the present exemplary embodiment includes a performance setting value correction unit 107 in addition to the components of the first exemplary embodiment. The storage management apparatus 10 according to the present exemplary embodiment differs from the case of the first exemplary embodiment in that it corrects target value beforehand on the basis of the data size of the volume 302 obtained beforehand. Hereinafter, correction of the target value will mainly be described. Note that, in the following description, description will be omitted for operations of the component similar to the case of the first exemplary embodiment.

The performance setting value correction unit 107 includes the performance setting value table 121. The performance setting value correction unit 107 obtains, from the performance information acquisition unit 101, the data size after a predetermined time passes from the current time among the data size of the volume 302 before adjustment obtained by the performance information acquisition unit 101 at learning processing. In the present exemplary embodiment, the performance setting value correction unit 107 obtains data size after 10 minutes, as the data size after a predetermined time.

Moreover, the performance setting value correction unit 107 obtains current performance setting value information from the bandwidth management unit 104. Next, the performance setting value correction unit 107 calculates the target data size from the IOPS and throughput corresponding to the obtained performance setting value.

Next, the performance setting value correction unit 107 determines whether the calculated target data size is below the data size after the predetermined time. When the calculated target data size is below the data size after the predetermined time, the performance setting value correction unit 107 specifies a performance setting value that allows the target data size to be the data size after the predetermined time, or above, from the performance setting value table 121. Subsequently, the performance setting value correction unit 107 notifies the specified performance setting value to the bandwidth management unit 104. The performance setting value correction unit 107 corresponds to an exemplary "target value correction unit".

The bandwidth management unit 104 obtains the target value corresponding to the performance setting value input from the input apparatus 501, from the performance setting value table 121. Subsequently, the bandwidth management unit 104 sets the obtained target value. Thereafter, the bandwidth management unit 104 performs QoS evaluation processing using the measured performance and the target value of the volume 302, obtained from the measured information acquisition unit 105.

Moreover, the bandwidth management unit 104 transmits the target value set onto the volume 302, to the performance setting value correction unit 107. Subsequently, in the case of receiving the performance setting value from the performance setting value correction unit 107 during execution of QoS evaluation processing, the bandwidth management unit 104 obtains a target value corresponding to the received performance setting value, from the performance setting value table 121. Subsequently, the bandwidth management unit 104 sets the obtained target value onto the volume 302. Thereafter, the bandwidth management unit 104 performs QoS evaluation processing using the measured performance and the set target value of the volume 302, obtained from the measured information acquisition unit 105.

Figure 10:
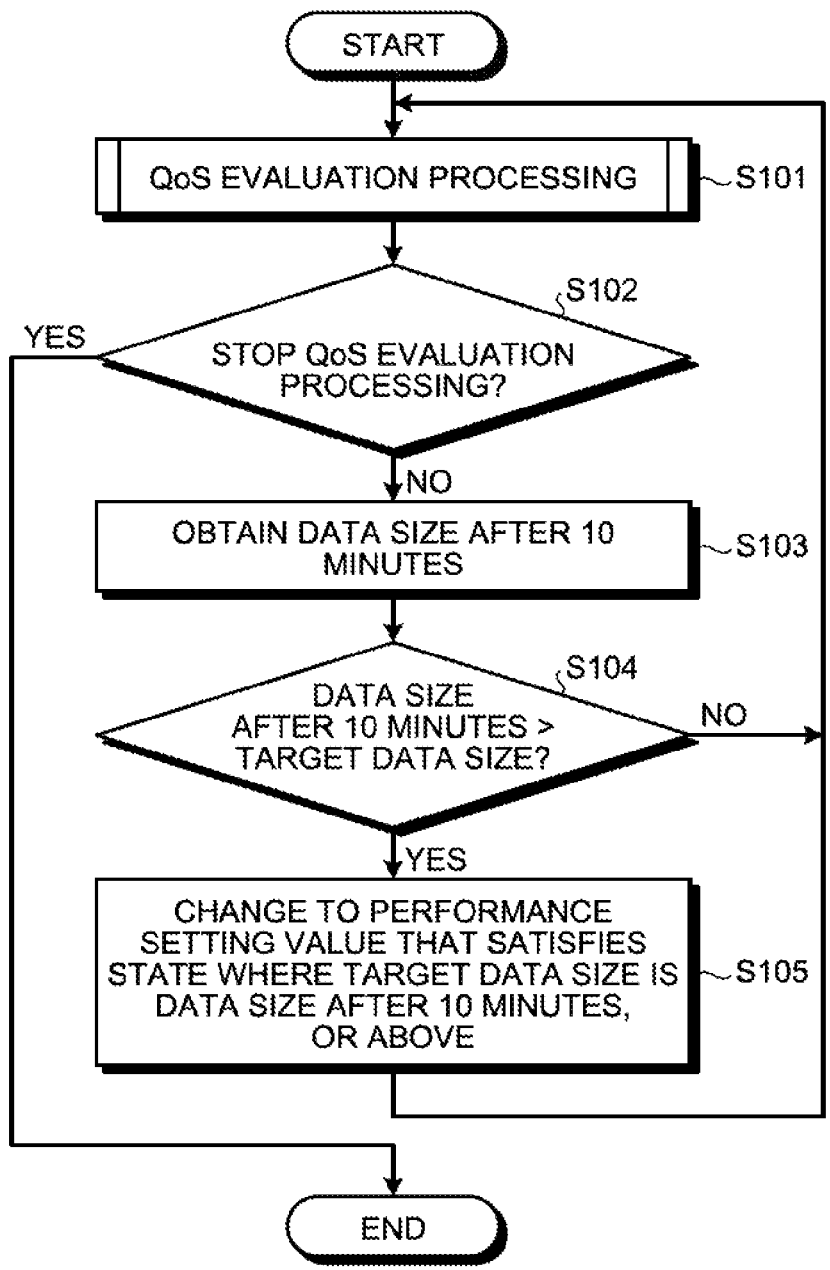
FIG. 10 is a flowchart of correction processing of a target value performed by a storage management apparatus according to the third exemplary embodiment.

Next, a flow of target value correction processing using the storage management apparatus 10 according to the present exemplary embodiment will be described with reference to FIG. 10. FIG. 10 is a flowchart of correction processing of a target value performed by a storage management apparatus according to the third exemplary embodiment.

The bandwidth management unit 104 performs QoS evaluation processing (step S101) using the measured performance of the volume 302 obtained from the measured information acquisition unit 105 and using a target value corresponding to the performance setting value designated by the administrator.

The bandwidth management unit 104 determines whether to stop the QoS evaluation processing (step S102) depending on whether a stop instruction has been received from the input apparatus 501. In the case of stopping the QoS evaluation processing (step S102: Yes), the bandwidth management unit 104 cancels setting of the target value onto the volume 302 and finishes QoS processing.

In contrast, in the case of not stopping the QoS evaluation processing (step S102: No), the performance setting value correction unit 107 obtains, from the performance information acquisition unit 101, the data size after 10 minutes from the current time, among the data size of the volume 302 before adjustment (step S103).

Moreover, the performance setting value correction unit 107 obtains current performance setting value information from the bandwidth management unit 104 and calculates the target data size. Subsequently, the performance setting value correction unit 107 determines whether the target data size is below the data size after 10 minutes (step S104). In a case where the target data size is the data size after 10 minutes, or above (step S104: No), the storage management apparatus 10 returns to step S101.

In contrast, in a case where the target data size is below the data size after 10 minutes (step S104: Yes), the performance setting value correction unit 107 specifies a performance setting value that allows the target data size to be the data size after 10 minutes, or above, from the performance setting value table 121. Subsequently, the performance setting value correction unit 107 notifies the specified performance setting value to the bandwidth management unit 104. The bandwidth management unit 104 changes the performance setting value to use, to the performance setting value notified from the performance setting value correction unit 107 (step S105), and returns to step S101.

Next, effects of bandwidth adjustment using QoS evaluation processing by the storage management apparatus 10 according to the present exemplary embodiment will be described with reference to FIG. 11. FIG. 11 is a diagram for illustrating an effect of bandwidth adjustment using QoS evaluation processing performed by an operation management server according to the third exemplary embodiment.

In FIG. 11, the vertical axis represents the response time, and the horizontal axis represents the time. A graph 211 is a graph representing the response time in a case where the QoS evaluation processing is not implemented. A graph 212 is a graph representing the response time in a case where no target value correction is performed. Moreover, a graph 213 is a graph representing the response time in a case where the storage management apparatus 10 according to the present exemplary embodiment is used. Herein, description will be given for a case where the response time is used as the target value. In other words, herein, the target value is a target response time.

In a case where the QoS evaluation processing is not implemented, this means no target response time is set. Accordingly, bandwidth adjustment is not performed even when the response time becomes long, and thus, the response time remains long as illustrated in the graph 211.

In contrast, in a case where the QoS evaluation processing is executed without performing target value correction, the bandwidth is expanded in a case where the response time exceeds the target response time. That is, as illustrated in the graph 212, the bandwidth is expanded at a timing 221 after the bandwidth exceeds the target response time, and the response time is gradually reduced so as to be within the target response time. Accordingly, the response time ultimately falls within the target response time and the storage apparatus 30 achieves desired performance. In this case, however, since the target response time is exceeded once, the storage apparatus 30 has difficulty in achieving the desired performance for a certain degree of time.

In contrast, in a case where the storage management apparatus 10 according to the present exemplary embodiment is used, the target response time is changed in accordance with the prediction of the change in the load of the volume 302 before exceeding the target response time. That is, bandwidth is allocated to the volume 302 at a timing 231 before the target response time is exceeded. This can prevent the response time from exceeding the target response time, making it possible to allow the storage apparatus 30 to continuously achieve desired performance.

For example, it is assumed that the QoS evaluation processing is being performed when the performance setting value is "13" at a point of 01:55. At this point, the target value is achieved without using the volume 302. However, for example, in a case where backup is scheduled on the volume 302 from the time 02:00, IO load would increase, and thus, it would be difficult to achieve the target value with this state. In this respect, the storage management apparatus 10 according to the present exemplary embodiment can predict an increase in the IO load 10 minutes before the IO load increases for backup. Moreover, even in a case where the target value has been achieved at this point, the storage management apparatus 10 forcibly changes the performance setting value to four, for example. This would expand the bandwidth of the volume 302 and thus can achieve the target value after the time 02:00.

As described above, the storage management apparatus according to the present exemplary embodiment predicts the change in the load of volume and forcibly changes the bandwidth before the target value is exceeded in accordance with the prediction. With this configuration, it is possible to appropriately adjust the bandwidth in accordance with the operation of the storage apparatus.

Note that programs to implement the functions of the performance information acquisition unit 101, the preliminary investigation execution unit 102, the notification unit 103, the bandwidth management unit 104, and the measured information acquisition unit 105, as illustrated in FIG. 2, need not be initially stored on the hard disk as described above. This also applies to the programs to implement the functions of the target value correction unit 106 and the performance setting value correction unit 107, as illustrated in FIGS. 8 and 9. For example, each of the programs is stored in a "portable physical medium" such as a flexible disk, a compact disc (CD), a digital versatile disc (DVD), a magneto optical disk, and an integrated circuit (IC) card, inserted into the storage management apparatus 10. It is also allowable to configure such that the storage management apparatus 10 obtains each of the programs from any of the portable physical media and executes the program. Alternatively, it is also allowable to configure such that each of the programs is stored in another computer or a server apparatus connected to the storage management apparatus 10 via a public network, the Internet, a local area network (LAN), a wide area network (WAN), and that the storage management apparatus 10 obtains each of the programs from these and execute the program. Moreover, this also applies to the read-write control unit 301, the bandwidth control unit 303, and the performance measurement unit 304, according to the storage apparatus 30, and applies to the calculation processing unit 401, the transmission-reception unit 402, and the performance measurement unit 403, according to the business server 40.

The present invention disclosed by the present application relates to a storage management apparatus, a storage apparatus management method, and a storage apparatus management program. According to one aspect of the present application, it is possible to achieve an effect of appropriately performing adjustment of the bandwidth in accordance with the operation status of the storage apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage management apparatus that manages a storage apparatus on which data transmission and reception is performed with an information processing apparatus, the storage management apparatus comprising:
a processor configured to:
sequentially set a plurality of target values for each of a plurality of predetermined times and execute adjustment of a bandwidth of the storage apparatus on the basis of each of the set target values;
obtain performance information for each of the predetermined times regarding the information processing apparatus in a case where adjustment of the bandwidth is not performed, and obtain the performance information regarding the information processing apparatus for the predetermined time for each of the target values in a case where the adjustment of the bandwidth is performed;
notify the performance information obtained; and
adjusts a bandwidth of the storage apparatus on the basis of a specific target value, on the basis of an input of the specific target value after notification.

2. The storage management apparatus according to claim 1, wherein
the processor configured to stop execution of setting of the target value and adjustment of the bandwidth in a case where the performance information regarding the information processing apparatus for the predetermined time for each of the target values when the adjustment of the bandwidth is performed exceeds a threshold.

3. The storage management apparatus according to claim 1, wherein
the processor configured to
obtain measured performance which is a result of measurement of performance of the storage apparatus in data transmission and reception with the information processing apparatus; and
correct the specific target value using the performance information obtained and measured performance obtained.

4. The storage management apparatus according to claim 1, wherein
the processor configured to predict a performance change of the storage apparatus on the basis of the performance information obtained and changes the specific target value on the basis of the predicted performance change.

5. A storage apparatus management method comprising:
obtaining first performance information for each of predetermined times regarding an information processing apparatus in a case where adjustment of a bandwidth for a storage apparatus on which data transmission and reception is performed with the information processing apparatus is not performed;
sequentially setting a plurality of target values for each of the predetermined times and then executing adjustment of the bandwidth of the storage apparatus on the basis of each of the set target values;
obtaining second performance information regarding the information processing apparatus for the predetermined time for each of the target values in a case where the adjustment of the bandwidth is performed;
notifying the obtained first performance information and second performance information; and
adjusting the bandwidth of the storage apparatus on the basis of a specific target value, on the basis of an input of the specific target value after notification.

6. A non-transitory computer-readable recording medium having stored therein a program that causes a computer to execute processing comprising:
obtaining first performance information for each of predetermined times regarding an information processing apparatus in a case where adjustment of a bandwidth for a storage apparatus on which data transmission and reception is performed with the information processing apparatus is not performed;
sequentially setting a plurality of target values for each of the predetermined times and then executing adjustment of the bandwidth of the storage apparatus on the basis of each of the set target values;
obtaining second performance information regarding the information processing apparatus for the predetermined time for each of the target values in a case where the adjustment of the bandwidth is performed;
notifying the obtained first performance information and second performance information; and
adjusting the bandwidth of the storage apparatus on the basis of a specific target value, on the basis of an input of the specific target value after notification.

* * * * *